United States Patent
Sturgis

(10) Patent No.: US 6,550,421 B1
(45) Date of Patent: Apr. 22, 2003

(54) AUTOMATIC HAY FEEDER

(75) Inventor: Dale L. Sturgis, Holdrege, NE (US)

(73) Assignee: Besler Industries, Inc., Cambridge, NE (US)

( * ) Notice: Subject to any disclaimer, the term of this patent is extended or adjusted under 35 U.S.C. 154(b) by 0 days.

(21) Appl. No.: 10/100,741

(22) Filed: Mar. 18, 2002

(51) Int. Cl.[7] .......................... A01K 39/00; A01K 1/10; A01K 5/00

(52) U.S. Cl. .................. 119/57.92; 119/51.11; 119/60

(58) Field of Search .................. 119/51.11, 51.12, 119/57.92, 60, 61, 736, 738

(56) References Cited

U.S. PATENT DOCUMENTS

| | | | |
|---|---|---|---|
| 489,789 A | 1/1893 | Carpenter | |
| 3,187,720 A | 6/1965 | Stoltzfus | |
| 3,382,847 A | * 5/1968 | Clark | 119/51.11 |
| 3,638,618 A | * 2/1972 | Strother | 119/51.12 |
| 4,617,874 A | 10/1986 | Zammarano | |
| 4,930,449 A | * 6/1990 | Harton | 119/60 |
| 4,949,675 A | 8/1990 | Parks | |
| 5,205,241 A | * 4/1993 | Halpin et al. | 119/60 |
| 5,394,832 A | 3/1995 | Briley | |
| 5,520,143 A | 5/1996 | Duin | |
| 5,582,131 A | 12/1996 | Curtis | |
| 5,669,328 A | * 9/1997 | Lanfranchi | 119/57.92 |
| 5,740,757 A | * 4/1998 | Smeester | 119/57.92 |
| 5,899,169 A | 5/1999 | Jenson | |

* cited by examiner

Primary Examiner—Charles T. Jordan
Assistant Examiner—Elizabeth Shaw
(74) Attorney, Agent, or Firm—Thomte, Mazour & Niebergall; Dennis L. Thomte

(57) ABSTRACT

A livestock feeder including a first cylindrical wall structure having a plurality of head stocks extending upwardly and inwardly therefrom to a cone-shaped hood. A flexible curtain extends downwardly from the hood around the upper ends of the head stocks. A second wall structure is positioned outwardly of the first wall structure and is vertically movable from a lower position to an upper position by means of an electric motor operatively connected thereto. When the second wall structure is in its lower position, the animals may feed from the feeder. When the second wall structure is in its upper position, the animals do not have access to the feed within the feeder.

20 Claims, 5 Drawing Sheets

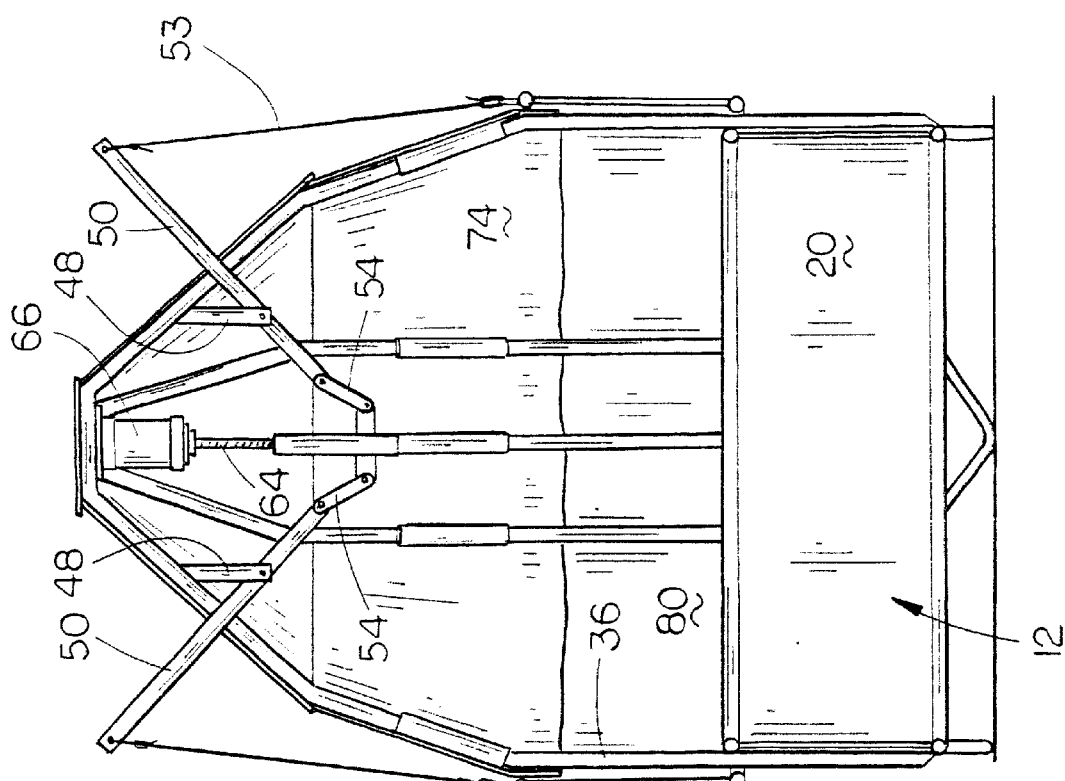
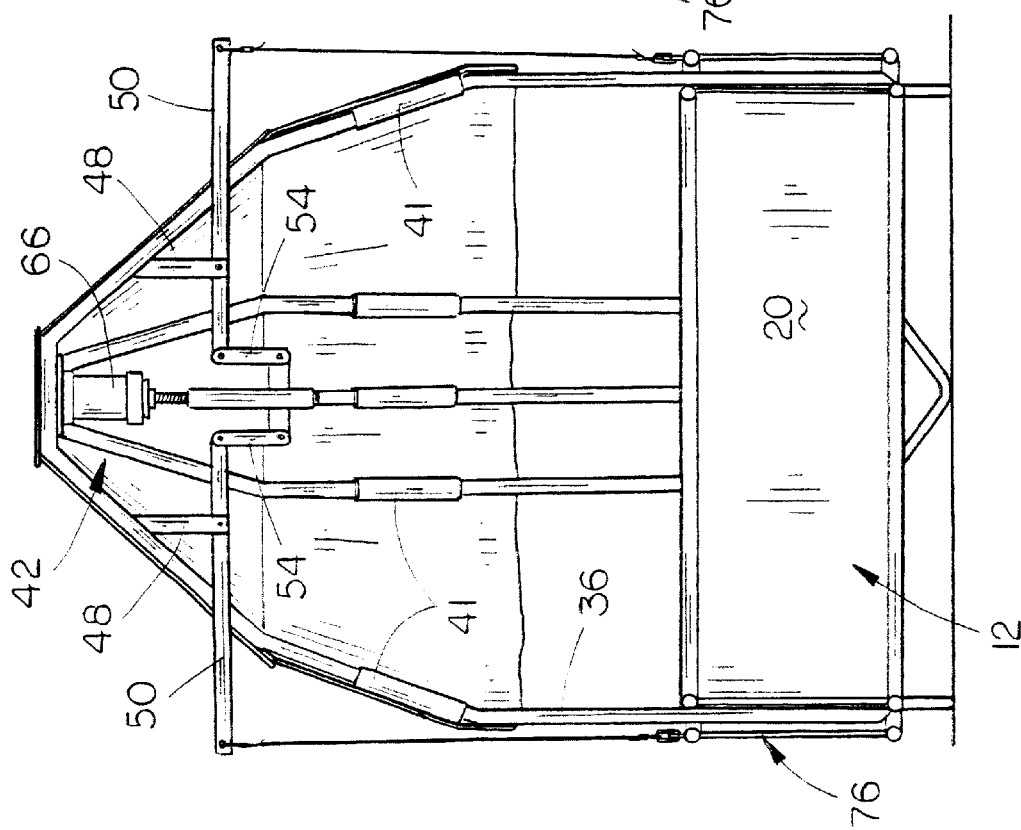
FIG. 5
FIG. 4

AUTOMATIC HAY FEEDER

BACKGROUND OF THE INVENTION

1. Field of the Invention

This invention relates to a hay feeder and more particularly to an automatic hay feeder for livestock such as horses or cattle.

2. Description of the Related Art

Many types of hay feeders have been previously provided for feeding livestock such as cattle or horses. Perhaps one of the most common type of hay feeders is what is termed a round bale feeder which comprises a cylindrical drum-like member into which the hay is placed. Such a feeder permits the livestock to feed therefrom in an unrestricted manner which results in a considerable wastage of hay. Further, the round bale feeder does not have any means for protecting the hay from the elements such as rain, snow, etc.

Other types of feeders have been provided wherein access to the feed is controlled by a timer controlled gate or door. Devices of this type are normally not reliable, are not large enough for livestock such as cattle or horses, or can injure the livestock during the operation thereof.

SUMMARY OF THE INVENTION

An automatic hay feeder is disclosed comprising a first cylindrical wall structure having a plurality of horizontally spaced-apart head stocks secured thereto and which extend upwardly therefrom. A cone-shaped hood is secured to the upper ends of the head stocks and has its lower edge spaced above the upper edge of the first wall structure. A flexible curtain extends downwardly from the hood around the head stocks and has its upper end received within the lower end of the cone-shaped hood. The lower end of the curtain is spaced above the upper end of the first wall structure. A second wall structure is positioned outwardly of the first wall structure and is vertically movable between a lower position to an upper position. When the second wall structure is in its lower position, the livestock may access the hay within the first wall structure by extending their heads and necks between the head stocks below the lower end of the flexible curtain and above the upper end of the first wall structure. When the second wall structure is in its upper position, the livestock are denied access to the hay within the first wall structure.

An electric motor, either battery operated or conventionally operated, is provided within the hood and is operatively connected to the second wall structure for raising and lowering the second wall structure. A timer is operatively connected to the electric motor for controlling the feeding times of the livestock. Preferably, if a battery operated electric motor is utilized, a solar panel is provided for charging the battery of the battery operated electric motor.

Each of the first and second wall structures are formed of first and second semicircular members pivotally secured to one another so that the second wall structure may be opened and the first wall structure may be opened to position hay within the interior of the feeder.

Although a cylindrical hay feeder is shown and described, the hay feeder could also have a square configuration.

It is therefore a principal object of the invention to provide an improved livestock feeder.

A further object of the invention is to provide an automatic livestock feeder.

Still another object of the invention is to provide an automatic hay feeder including a hood and flexible curtain which protects the hay within the feeder from the elements.

Still another object of the invention is to provide an automatic hay feeder for livestock wherein an outer wall structure is vertically movable to open and close feed access openings.

Still another object of the invention is to provide an automatic hay feeder which is battery operated and which includes a solar panel for recharging the battery of the electric motor.

Still another object of the invention is to provide an automatic hay feeder which includes a flexible curtain positioned above the access openings so that if a feeding horse should raise its head, the horse will not be injured nor will the mane of a horse be damaged.

These and other objects will be apparent to those skilled in the art.

BRIEF DESCRIPTION OF THE DRAWINGS

FIG. 4 is a partial sectional view illustrating the outer wall structure in its lower position;

FIG. 5 is a partial sectional view illustrating the outer wall structure in its upper position.

DESCRIPTION OF THE PREFERRED EMBODIMENT

Figure 1:
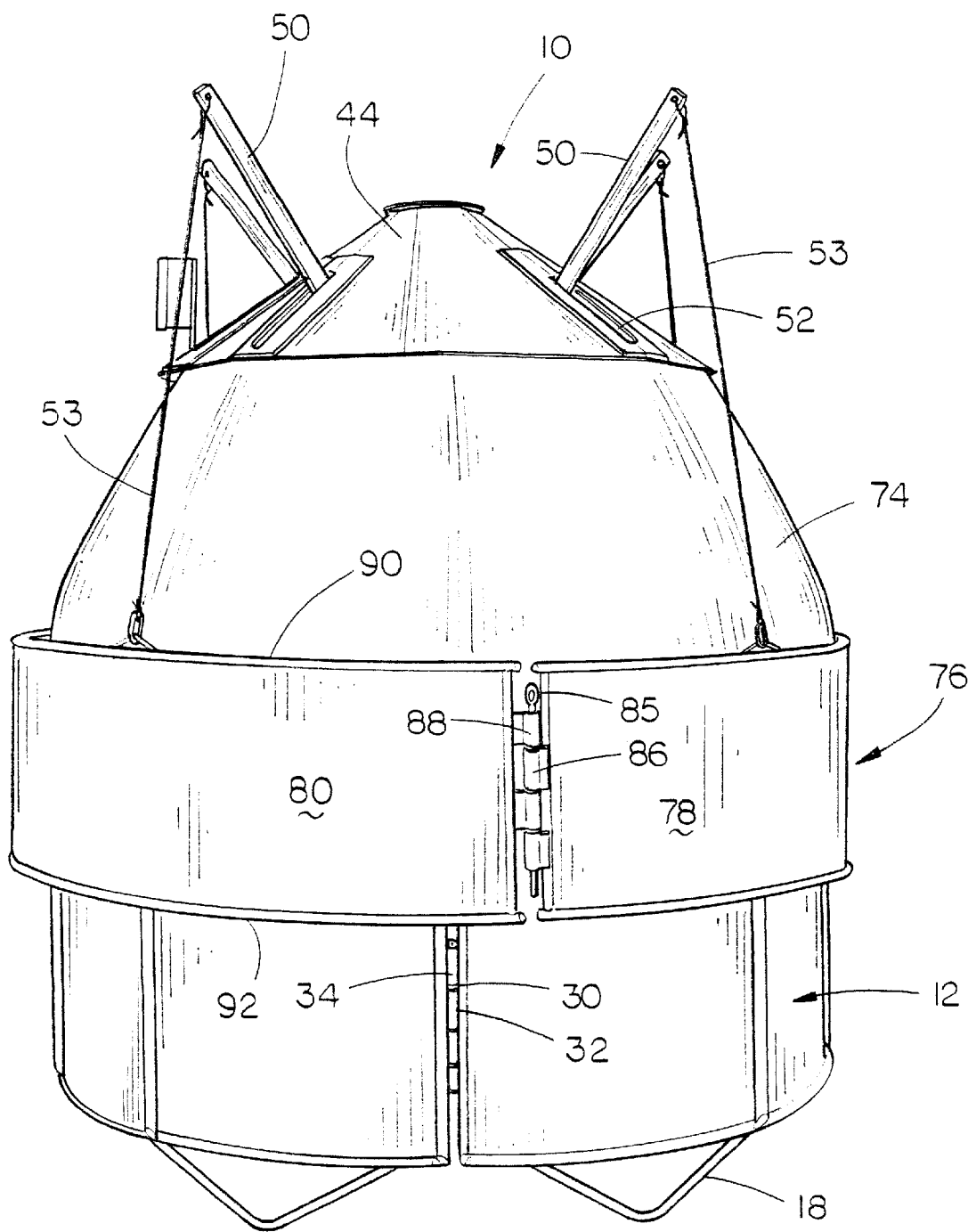
FIG. 1 is a perspective view of the feeder of this invention with the feed openings thereof being closed.

The automatic hay feeder of this invention is referred to generally by the reference numeral 10. Feeder 10 includes a first or inner cylindrical wall section 12 having an upper end 14 and a lower end 16 which is supported above the ground by legs 18 welded thereto. Wall structure 12 is comprised of a pair of semi-circular wall sections 20 and 22 which are pivotally or hingedly secured together at 24 to enable the wall section 22 to be pivotally or hingedly moved with respect to wall section 20 to provide access to the interior of the wall structure 12 to either place feed therein or to clean the interior thereof. The free ends 26 and 28 of wall sections 20 and 22 may be secured together by means of a rod or pipe 30 extending downwardly through collars 32 provided on free end 26 and collars 34 provided on free end 28.

A plurality of head stocks or pipes 36 are welded to the exterior surface of wall structure 12 and extend upwardly therefrom in a horizontally spaced relationship. The upper ends of the head stocks 36 are provided with upper end portions 38 which extend upwardly and inwardly with respect thereto, as seen in the drawings. Pipes or tubes 40 are detachably secured to upper end portions 38 by slidable sleeves 41 and extend upwardly and inwardly therefrom to form a part of the framework 42 for a cone-shaped hood 44 having a lower edge 46. A plurality of supports 48 are secured to at least some of the pipes or tubes 40 by welding or the like and extend downwardly therefrom. An elongated frame member 50 is pivotally secured to the lower end of each of the supports 48 at the lower end thereof by means of a bolt 51 or the like. The outer ends of the frame members 50 protrude outwardly through openings 52 formed in the cone-shaped hood 44, as seen in the drawings, and have flexible ropes or cables 53 secured to the outer ends thereof. A link 54 is pivotally connected at its upper end to the inner end of each of the frame members 50 by means of a bolt 56 or the like. The lower ends of the links 54 are pivotally connected to the arms 58 by a bolt 60 or the like. The inner ends of the arms 58 are rigidly secured to an internally threaded pipe 62. Screw 64 is threadably received within pipe 62 and is operatively connected to an electric motor 66 which may be either battery operated or which may be connected to a source of 115-volt AC. Preferably, motor 66 is of the reversible type and includes a gear box brake means for preventing the rotation of the screw 64 unless the motor is activated. If a battery operated motor is employed, it is preferred that a solar panel 68 be employed for charging the battery 70 thereof. Preferably, motor 66 is controlled by a timer 72 to control the feeding times of the feeder.

A truncated, cone-shaped flexible curtain 74 has its upper end received within the cone-shaped hood 44 and extends downwardly therefrom outwardly of the pipes or tubes 40 and the upper ends of the head stocks 36, as seen in the drawings.

Figure 2:
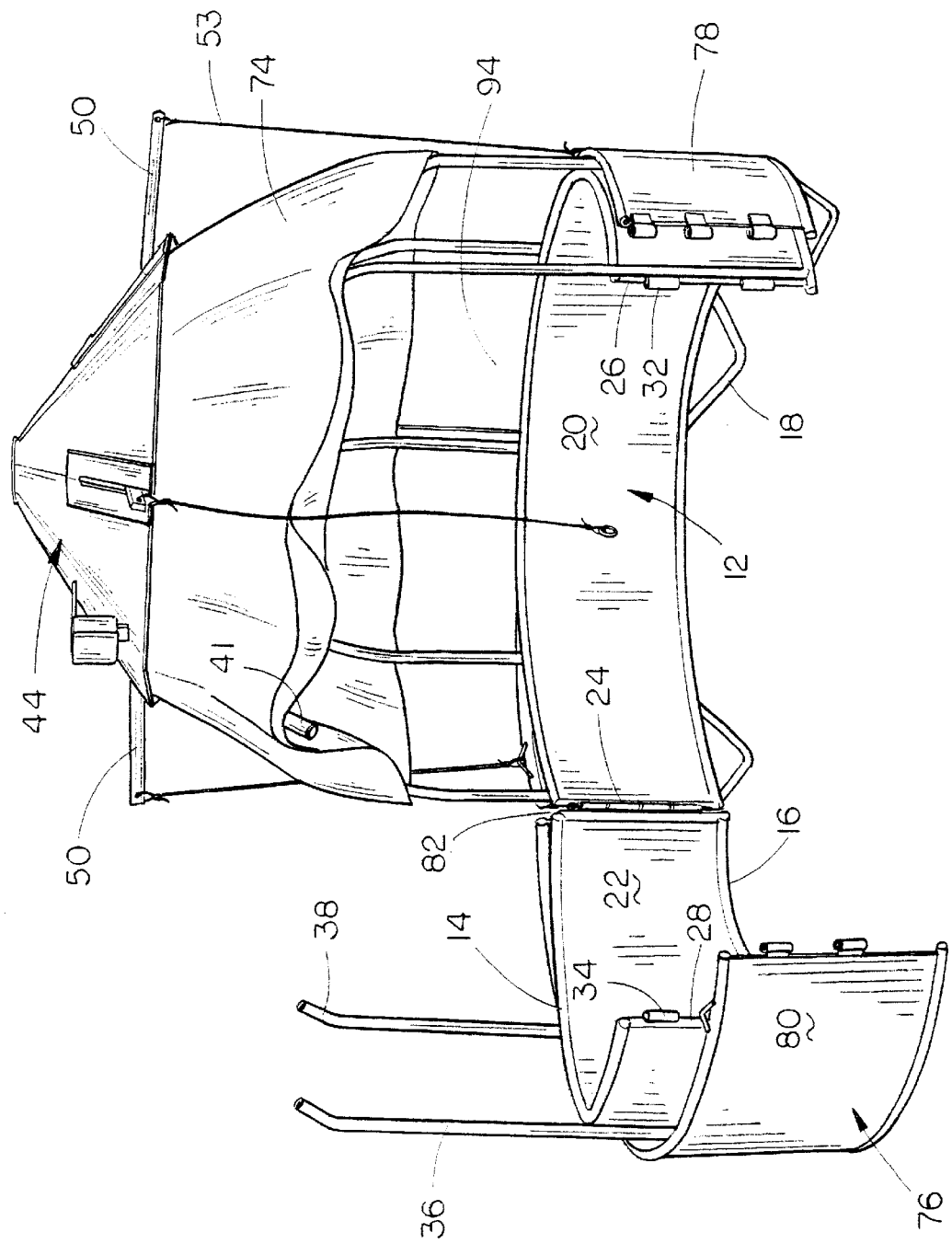
FIG. 2 is a perspective view illustrating the inner and outer wall sections being opened.
Figure 3:
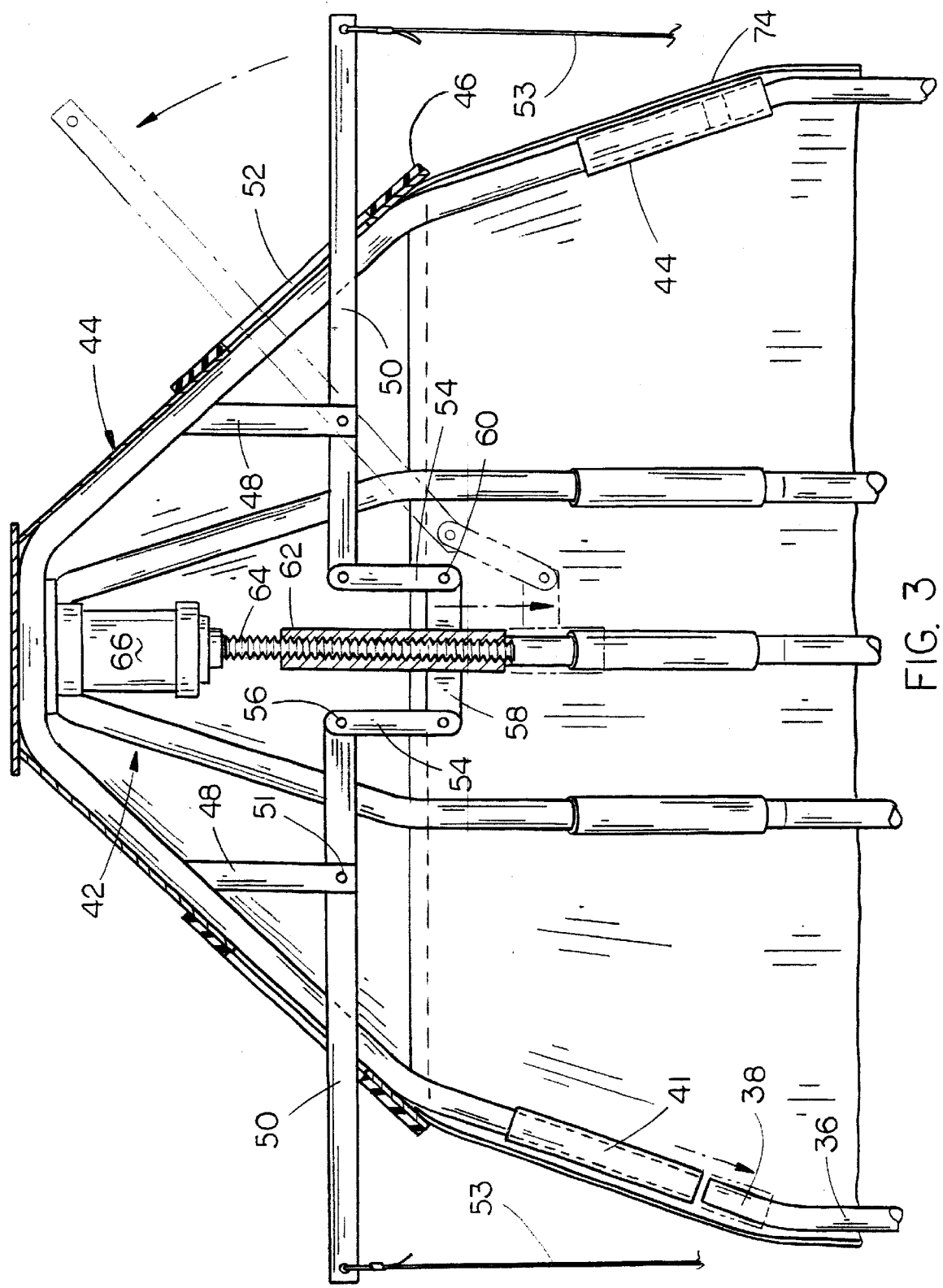
FIG. 3 is a partial sectional view illustrating the structure at the upper end of the feeder.
Figure 6:
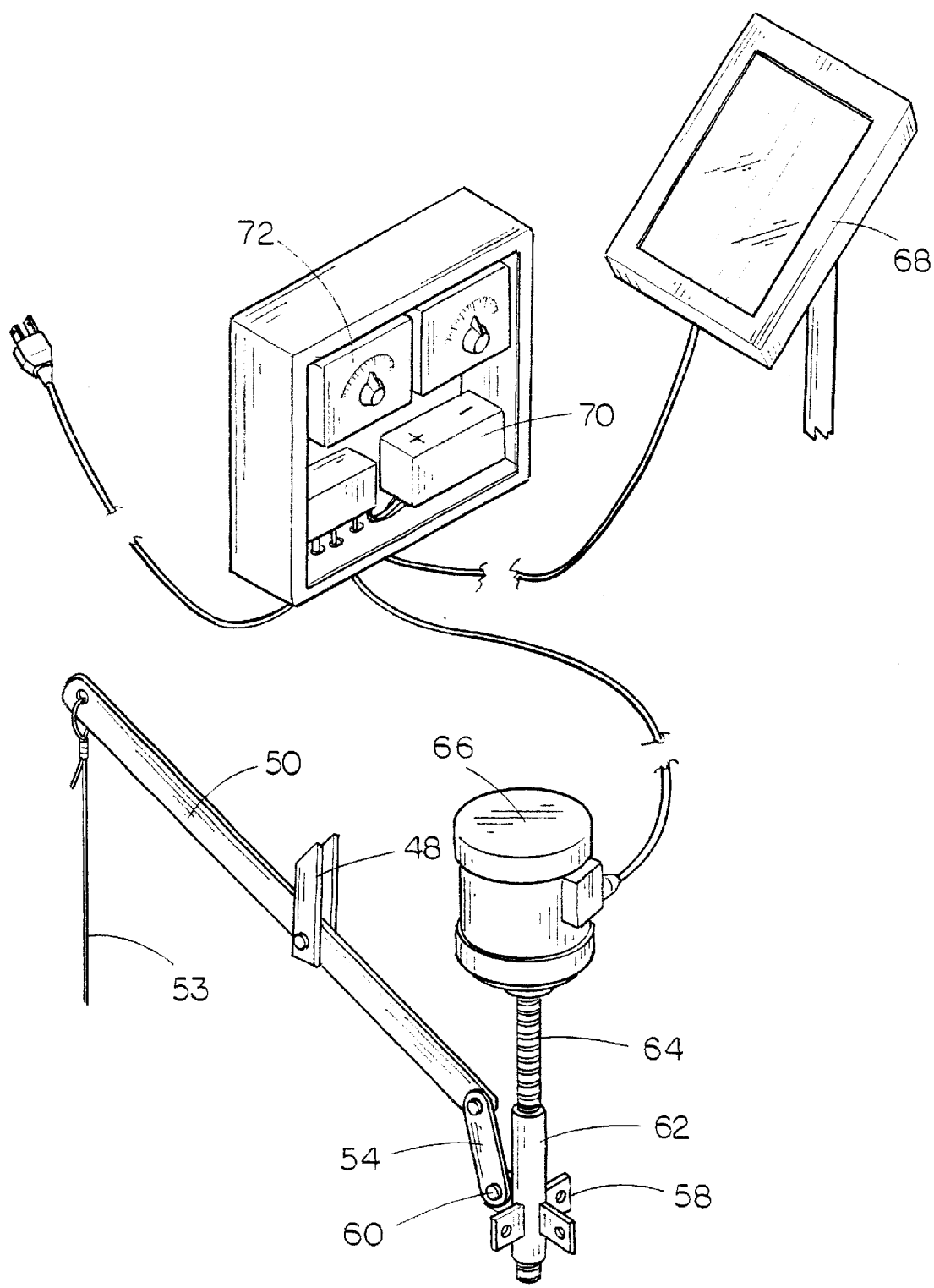
FIG. 6 is a partial perspective view of certain of the components of the feeder.

The numeral 76 refers to a second or outer wall structure which is cylindrical in shape and which is comprised of semi-circular wall sections 78 and 80. Wall sections 78 and 80 are pivotally or hingedly secured together at 82 and may be releasably secured together at their free ends by extending a rod 85 downwardly through the collars 86 and 88 mounted on the free ends of the wall sections 78 and 80, respectively. The semi-circular wall sections 78 and 80 may be opened to provide access to the interior of the feeder for the replenishment of feed in feeder or for cleaning the interior of the feeder when the wall section 12 is also opened, as seen in FIG. 2. The lower ends of the flexible cables or ropes 53 are secured to the upper end 90 of the wall structure 76. For purposes of description, wall structure 76 will also be described as having a lower end 92. The wall structure 76 is movable from a first lower position (FIG. 4) to a second upper position (FIG. 5). When the wall structure 76 is in its lower position, the animals can extend their heads and necks through the openings 94 between the head stocks 36. If the animal should raise its head, the head or the neck of the animal will come into contact with the flexible curtain 74 which will not injure the animal or damage the mane of a horse. The flexible curtain 74 and the cone-shaped hood 44 protect the feed within the feeder from rain, snow, etc.

If the feeding times of the livestock are to be controlled, the timer 72 will be set accordingly. If it is desired to prevent the livestock from feeding during certain times, the timer 72 will cause the actuation of the electric motor 66 which will threadably rotate screw 64 thereby causing the internally threaded pipe 62 to move downwardly with respect to screw 64 thereby causing the outer ends of the frame members 50 to pivotally move upwardly thereby causing the cables 52 to raise the wall structure 76 to its upper position thereby closing the openings 94. When the time arrives for feeding, the timer 72 actuates the motor 66 so that the internally threaded pipe 62 moves upwardly on the screw 64 thereby causing the outer ends of the frame members 50 to pivotally move downwardly thereby lowering the wall structure 76 to its lower position so that the animals have access to the feed within the feeder. The controlled feeding times prevent hay or feed from being wasted.

When it is desired to add hay to the interior of the feeder or to clean the interior of the feeder, the rod 85 is removed from the collars 86 and 88 on wall sections 78 and 80 of wall structure 76 and the rod 30 is removed from the collars 32 and 34 on the wall sections 20 and 22 of wall structure 12. Those head stocks which are on the wall section 20 of wall structure 12 are disconnected from the pipes or tubes 40 associated therewith so that the wall sections 80 and 22 may be pivotally moved outwardly with respect to wall sections 78 and 20 thereby providing an opening through which the feed may pass or through which a person may enter.

Although the hay feeder shown and described is cylindrical, the hay feeder could have a square configuration if so desired to accommodate square-shaped bales. In such an embodiment, the shape of the hood 44 would be modified to the square-shaped feeder.

It can therefore be seen that a novel livestock feeder has been provided which accomplishes at least all of its stated objectives.

I claim:
1. A livestock feeder, comprising:
   a first wall structure having upper and lower ends;
   a plurality of horizontally spaced-apart head stocks secured to said first wall structure and extending upwardly therefrom;
   a hood secured to the upper ends of said head stocks which has an upper end and a lower edge;
   a flexible curtain, having an upper end and a lower peripheral edge;
   said flexible curtain having its upper end received by said hood;
   said lower peripheral edge of said flexible curtain normally being spaced above the upper end of said first wall structure to define a plurality of openings defined by said head stocks for admitting the heads and necks of livestock;
   and a second wall structure, having upper and lower ends, positioned outwardly of said first wall structure and extending therearound;
   said second wall structure, when in its said lower position, permitting the heads and necks of livestock to be admitted by said openings to permit the livestock to eat feed placed within said first wall structure;
   said second wall structure, when in its said upper position, closing said openings to prevent livestock from eating feed placed within said first wall structure.

2. The feeder of claim 1 further including means for raising and lowering said second wall structure with respect to said first wall structure.

3. The feeder of claim 2 wherein said means for raising and lowering said second wall structure comprises an electric motor.

4. The feeder of claim 3 wherein said electric motor is battery operated.

5. The feeder of claim 4 further including a solar panel apparatus for charging the battery.

6. The feeder of claim 4 wherein a timer selectively operates said battery operated electric motor.

7. The feeder of claim 3 wherein a timer selectively operates said electric motor.

8. The feeder of claim 2 wherein said electric motor is operatively connected to said second wall structure by flexible cables.

9. The feeder of claim 1 wherein said first and second wall structures are cylindrical.

10. The feeder of claim 9 wherein said first wall structure comprises first and second, semi-circular wall sections which are selectively pivotally secured together and wherein said second wall structure comprises first and second, semi-circular wall sections which are selectively pivotally secured together.

11. The feeder of claim 10 wherein at least some of the head stocks which are secured to said first wall section of said first wall structure comprise upper and lower head stock portions which are selectively joined together.

12. The feeder of claim 9 wherein said hood is cone-shaped.

13. A livestock feeder, comprising:
   a first wall structure having upper and lower ends;
   a plurality of horizontally spaced-apart head stocks secured to said first wall structure and extending upwardly therefrom;
   a hood secured to the upper ends of said head stocks which has an upper end and a lower edge;
   a flexible curtain, having an upper end and a lower peripheral edge;
   said flexible curtain having its upper end received by said hood;
   said lower peripheral edge of said flexible curtain normally being spaced above the upper end of said first wall structure to define a plurality of openings defined by said head stocks for admitting the heads and necks of livestock;
   and a second wall structure, having upper and lower ends, positioned outwardly of said first wall structure and extending therearound;
   said second wall structure, when in its said lower position, permitting the heads and necks of livestock to be admitted by said openings to permit the livestock to eat feed placed within said first wall structure;
   said second wall structure, when in its said upper position, closing said openings to prevent livestock from eating feed placed within said first wall structure;
   an electric motor positioned within said hood and having a vertically disposed rotatable screw operatively driven thereby;
   a plurality of elongated support arms, having inner and outer ends, pivotally secured intermediate the ends thereof to said hood;
   an internally threaded sleeve threadably mounted on said screw;
   said threaded sleeve moving upwardly on said screw when said motor is operated in a first direction;
   said threaded sleeve moving downwardly on said screw when said motor is operated in a direction opposite to said first direction;
   said inner ends of said support arms being pivotally secured to said sleeve;
   and cables secured to the outer ends of said support arms which extends downwardly therefrom for connection to said second wall structure whereby said second wall structure is moved upwardly with respect to said first wall structure when said sleeve is moved downwardly on said screw and whereby said second wall structure is moved downwardly with respect to said first wall structure when said sleeve is moved upwardly on said screw.

14. The feeder of claim 13 wherein said electric motor comprises a gear motor.

15. The feeder of claim 13 wherein said electric motor is battery operated.

16. The feeder of claim 15 further including a solar panel apparatus for charging the battery.

17. The feeder of claim 13 wherein a timer selectively operates said electric motor.

18. The feeder of claim 13 wherein said first and second wall structures are cylindrical.

19. The feeder of claim 18 wherein said first wall structure comprises first and second, semi-circular wall sections which are selectively pivotally secured together and wherein said second wall structure comprises first and second, semi-circular wall sections which are selectively pivotally secured together.

20. The feeder of claim 19 wherein at least some of the head stocks which are secured to said first wall section of said first wall structure comprise upper and lower head stock portions which are selectively joined together.

* * * * *